United States Patent [19]

Olesen

[11] Patent Number: 4,623,084
[45] Date of Patent: Nov. 18, 1986

[54] HAND-HELD STAPLER
[75] Inventor: Paul Olesen, Bellmore, N.Y.
[73] Assignee: Swingline Inc., Long Island City, N.Y.
[21] Appl. No.: 818,566
[22] Filed: Jan. 13, 1986

Related U.S. Application Data

[63] Continuation of Ser. No. 700,243, Feb. 11, 1985, abandoned.

[51] Int. Cl.$^4$ ............................ B25C 5/02; B25C 5/04
[52] U.S. Cl. ...................................... 227/153; 81/352; 227/155
[58] Field of Search ...................... 81/382, 383, 383.5, 81/412; 227/120, 130, 153, 154, 155, 143, 144

[56] References Cited
U.S. PATENT DOCUMENTS

| 643,937 | 2/1900 | Boggs | 227/155 X |
| 1,541,248 | 6/1925 | Carlson | 81/382 |
| 2,033,599 | 3/1936 | Vogel | 227/155 |
| 2,218,934 | 10/1940 | Germain | 227/155 X |
| 2,232,016 | 2/1941 | Walker | 227/153 |
| 2,687,522 | 8/1954 | Juilfs | 227/130 X |
| 2,795,787 | 6/1957 | Spencer | 227/144 X |
| 2,842,996 | 7/1958 | Coslow et al. | 81/383.5 X |
| 2,943,327 | 7/1960 | Juilfs | 227/130 |

FOREIGN PATENT DOCUMENTS 266103 7/1929 Italy ................................. 227/144

Primary Examiner—Paul A. Bell
Attorney, Agent, or Firm—Pennie & Edmonds

[57] ABSTRACT

A hand-held plier type stapler is disclosed. The stapler has a first handle to which an anvil is pivotally mounted. The first handle also houses a stapler head for forming and driving staples. A second handle is rotatably mounted to the first handle. Movement of the second handle moves the anvil towards a workpiece to be stapled and drives the stapler head to form and drive a staple.

3 Claims, 4 Drawing Figures

HAND-HELD STAPLER

This is a continuation of application Ser. No. 700,243, filed Feb. 11 1985 now abandoned.

BACKGROUND OF THE INVENTION

Staplers with pivotal anvils have been used and proposed in patents (Juilfs U.S. Pat. Nos. 2,687,522 and 2,943,327). Toggle devices have also been used in hand tools for increasing forces applied (see, for example, Carlson U.S. Pat. No. 1,541,248).

None of the prior devices have provided a tool with a pivotal anvil and an improved staple driving linkage for hand operation.

SUMMARY OF THE INVENTION

Broadly, the invention comprises a hand-held plier stapler having a first handle on which an anvil is pivotally mounted and has housed in it a stapler head unit from which staples are driven by a driver moving a path substantially perpendicular to the anvil. A second handle, mounted for rotation movement about the first handle, is connected to and caused during its initial movement to move away from the staple head unit causing the compression of the workpiece by the anvil's pivotal movement toward the head unit. Further movement of the second handle moves a driver extension piece, pivotally connected between the driver and the second handle, toward the staple head unit. As the second handle movement continues it moves the driver extension piece into a position nearly parallel with the path of the driver. This positioning of the driver extension and driver beginning at the time of staple penetration into the workpiece and continuing until the staple is clinched provides a toggle arrangement which applies high force to the driver with the hand application of a low force.

It is a feature of this invention that the forces generated make possible the use of a staple head unit to which staple blanks can be fed for both forming and driving in one stroke.

DESCRIPTION OF THE PREFERRED EMBODIMENT

Figure 1:
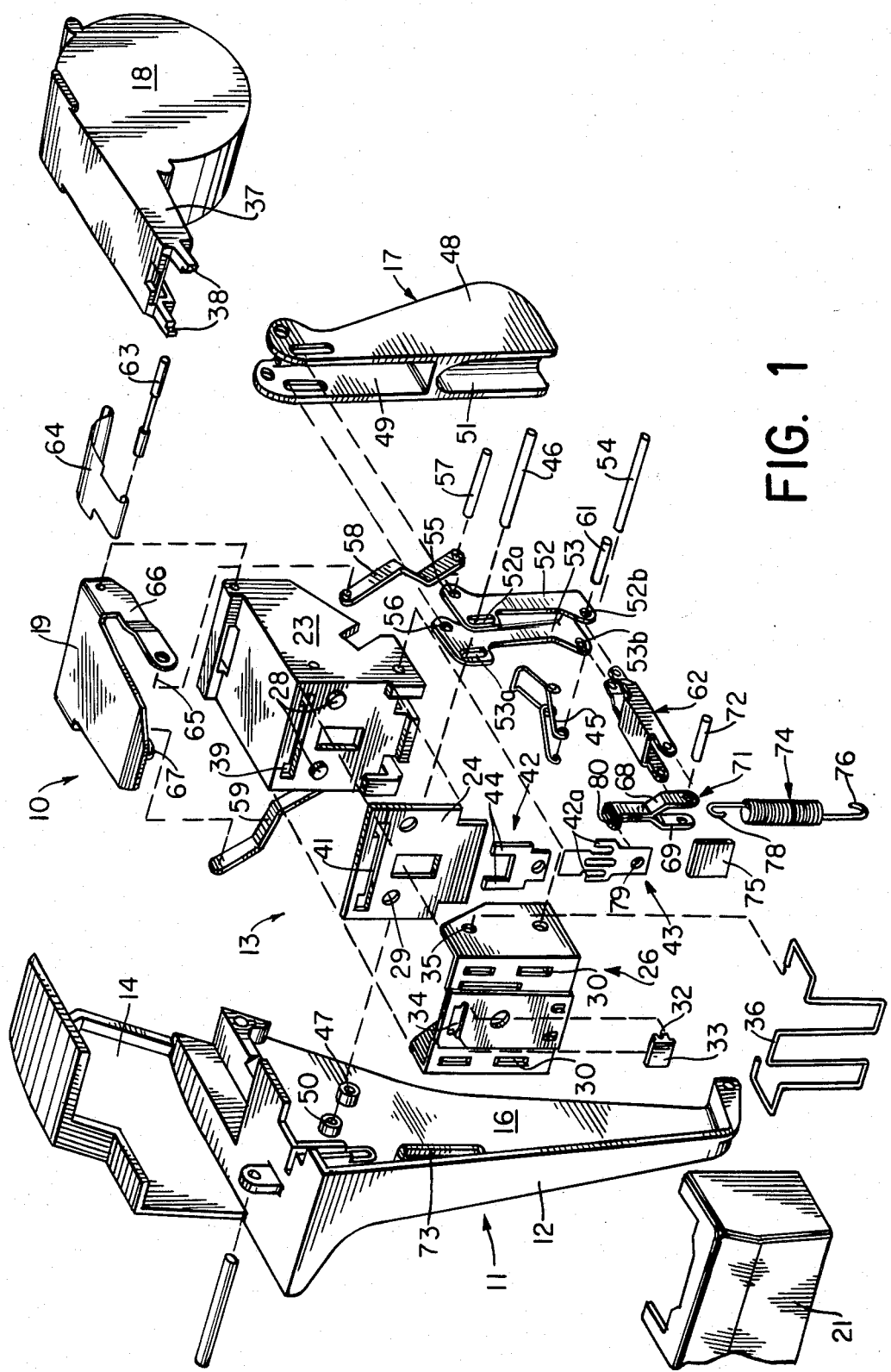
FIG. 1 is an exploded perspective view of the plier stapler of the present invention.

In FIG. 1, hand-held plier stapler 10 includes handle unit 11 (shown in section in FIG. 1) which unit in turn consists of first handle 12; staple head unit 13; staple cartridge housing 14 and staple driving linkage cavity 16. Also shown are second handle 17, staple blank belt cartridge 18, pivotal anvil 19, and removable cover 21 (see also FIG. 2).

Staple head unit 13 includes a block 23 made of light material, such as plastic; metal face plate 24 and staple head 26. Face plate 24 is mounted on block 23 using locating nipples 28 on block 23 which receive circular opening 29 in plate 24. Head 26 is spaced from plate 24 by spacer lugs 30 which protrude from head 26. Such spacing provides a staple discharge channel defining the path through which staple blanks pass as they are formed and driven toward anvil 19.

Stapling is accomplished by the delivery of staple blanks seriatim in belt form to groove 32 in staple block 33. Block 33 is mounted in opening 34 in head 26 and held against the head 26 by spring 36 engageable in head side holes 35. The staple belt is delivered to staple block 33 by cartridge 18 fitted in a chamber (not shown) within block 23. The cartridge chute 37 is located with its projections 38 extending through block opening 39 and plate opening 41. Projections 38 abut staple head 26. The staple blanks are formed and driven in a single upward stroke by former 42 and driver 43. The driver 43 drives the former 42 upwardly causing the prongs 44 of former 42 to engage and bend the staple blank to form a staple. As driver 43 continues in its upward movement, its flexible arms 42a are cammed to permit driver 43 to slide in frictional engagement relative to the former 42.

Now with reference to all figures, the arrangement for driving upwardly and thereafter retracting the driver 43 with respect to the pivotal anvil 19 includes second handle 17 mounted about guide rod 46 which rod 46 is in turn mounted in the first handle bushings 47. Rod 46 is fixed relative to the first handle 12 and spans the cavity 16. Second handle 17 includes a body section 48 preferably made of plastic having upper and lower recesses 49, 51 respectively. The upper recess 49 carries two spaced-apart lever plates 52, 53 each having a slot 52a, 53a to receive guide rod 46. Spring 45 is mounted on guide rod 46 and spring rod 54 to urge pivot rod 57 upwardly which opens handles 12, 17 (see FIG. 2). Spring rod 54 is journaled in bushings 50. Lever plate holes 55, 56 receive pivot pin 57. Anvil control arms 58, 59 are also mounted on pivot pin 57. Lever plates 52, 53 also include holes 52b, 53b to receive pivot pin 61 for connecting driver extension elongated link 62.

Figure 2:
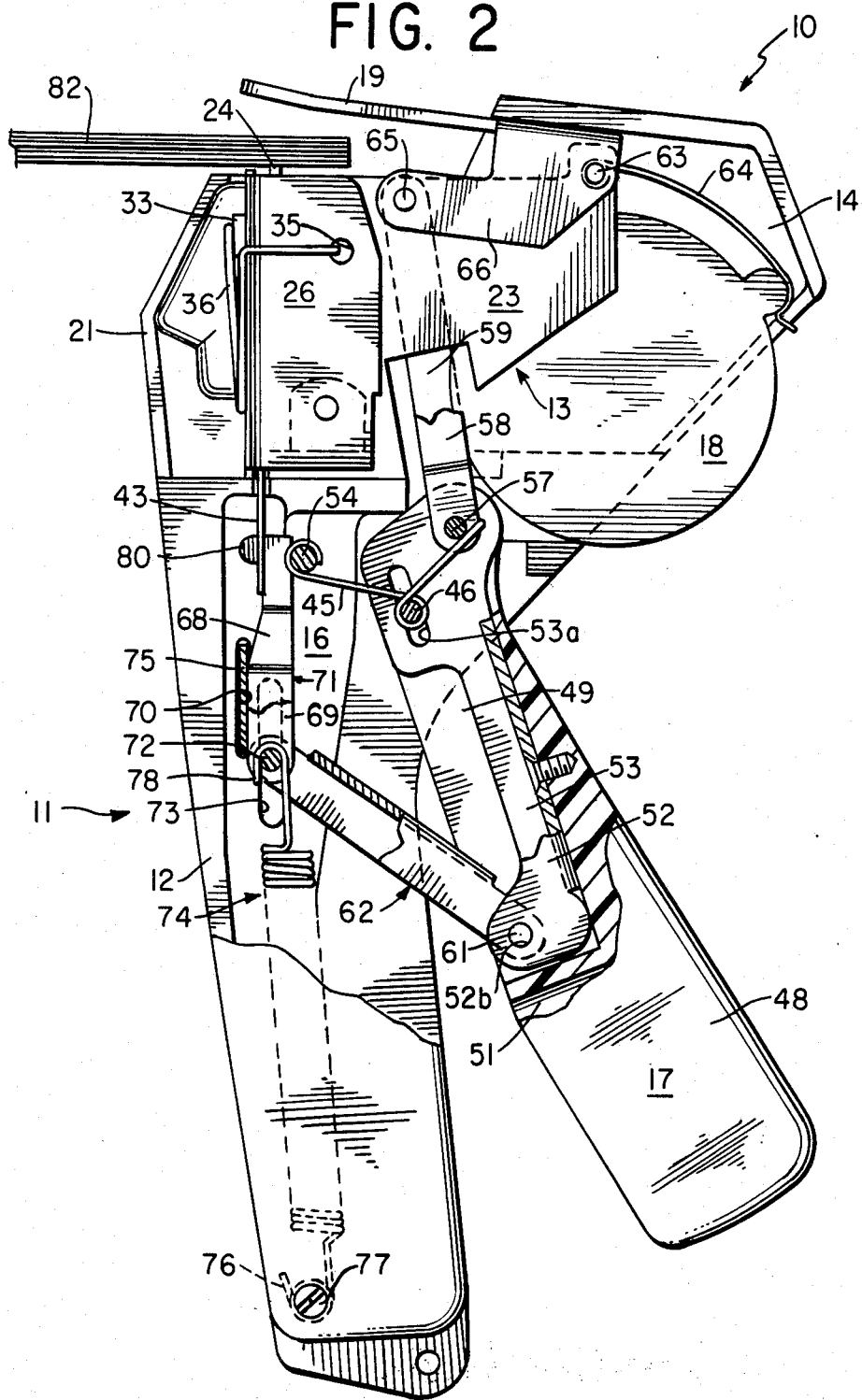
FIG. 2 is a side elevational view of the invention showing the stapler in its inactive position.

Anvil 19 is pivotally mounted about anvil pivot axle 63 which axle also carries cartridge retainer spring 64. Anvil side arms 66, 67 are pivotally connected to anvil puller arms 58, 59 about axis 65. Driver pusher link 62 is pivotally connected to spaced apart legs 68, 69 of driver connection piece 71 employing pivot rod 72 whose end portions ride in housing slots 73. Coil spribg 74, with lower hook 76 engaging spring bar 77 and upper hook 78 engaging pivot rod 72, urges the driver 43 and driver connection 71 downwardly into the retracted position (FIG. 2). Extension hook 80 of connection 71 engages driver 43 through hole 79. Coil spring 74 functions to maintain a compressive pressure on the workpiece 82 during the stapling stroke and, upon completion of the stapling stroke, to return the mechanism to its retracted position.

Figure 3:
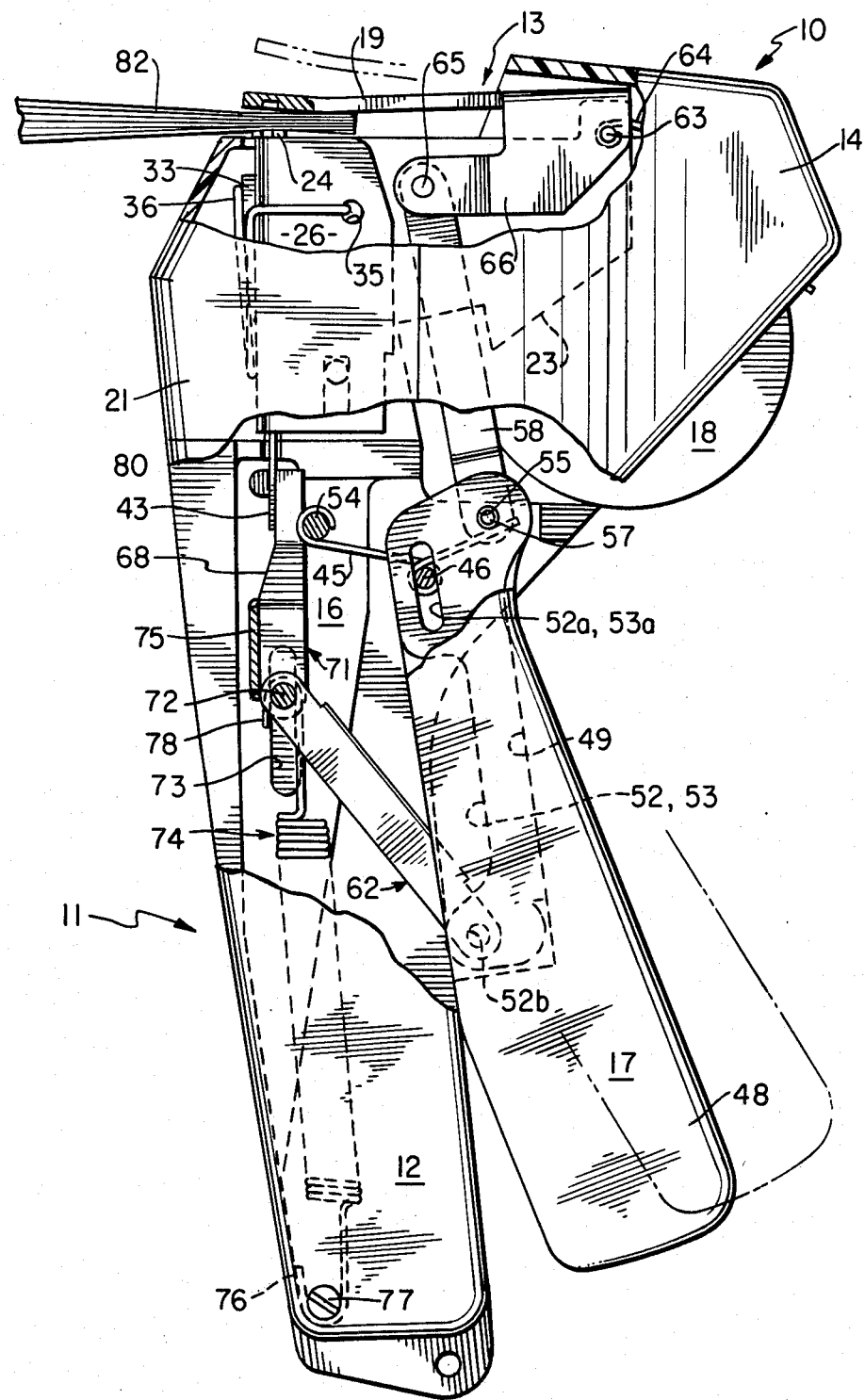
FIG. 3 is a side elevational view of the invention showing the stapler in a partially operated position.
Figure 4:
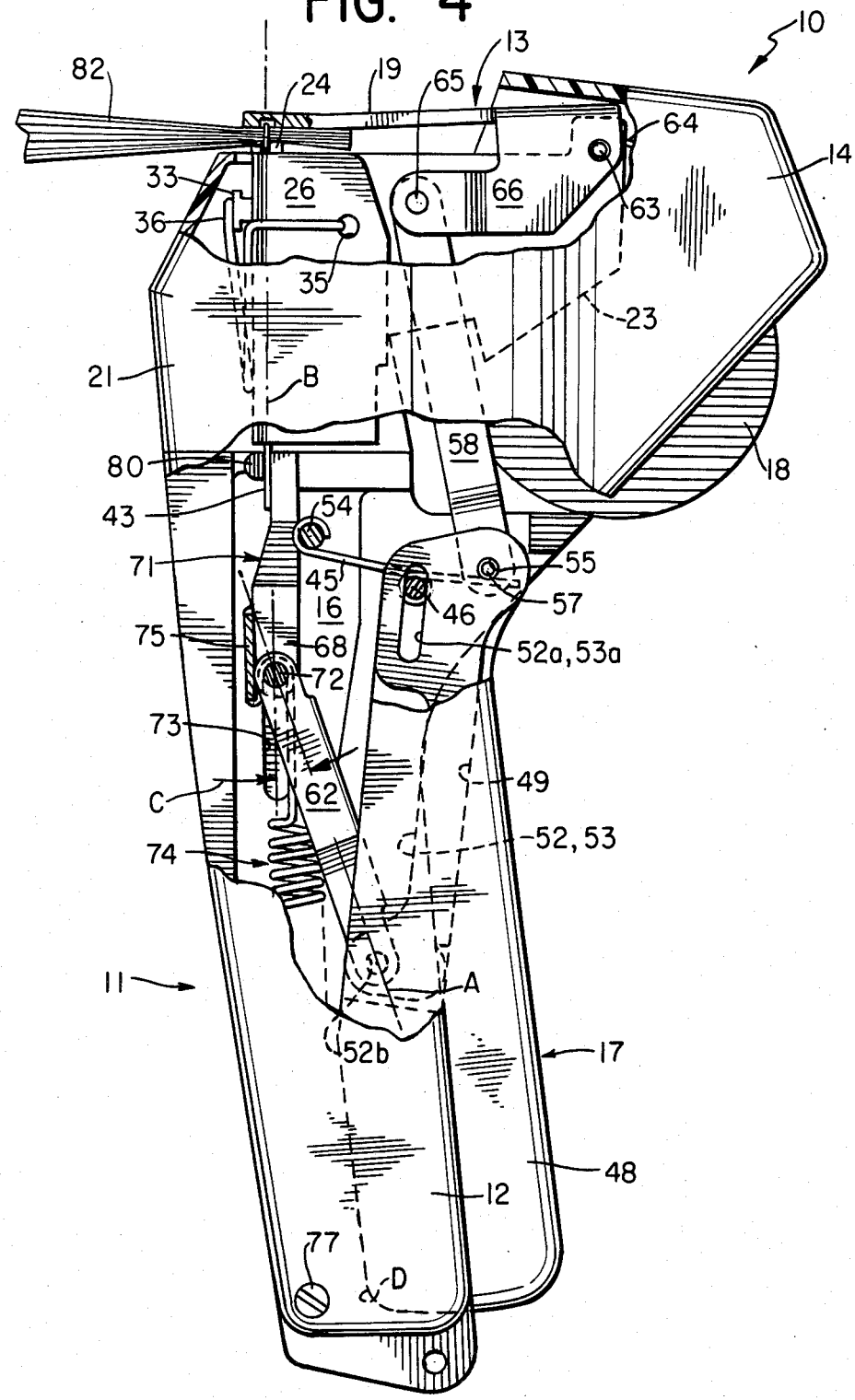
FIG. 4 is a side elevational view of the invention in its fully clinched position to set the staple.

In the operation of the plier tool 10, the workpiece 82 (FIG. 2) is placed between anvil 19 and the stapler head 26 with the handles 12, 17 in their relaxed spaced-apart positions and with the anvil 19 in its upper position (FIG. 2). In this rest position, control rod 46 is in an intermediary position in slots 52a, 53a and rod 72 is at the bottom of housing slots 73 (see FIG. 2). To set the staple, second handle 17 is moved toward first handle 12 causing anvil arms 66, 67 to move downwardly pulling anvil 19 down against the workpiece 82 (see FIG. 3). As the second handle 17 is moved further toward first handle 12, the point of principal rotation of the second handle becomes pivot rod 57. Turning finally to FIG. 4, continuing second handle 17 rotation causes the driver extension link 62 having centerline A to move closer to a position parallel to the path B of reciprocation of the former 42 and driver 43. The angle C between lines A and B is an acute angle in the range of 20° to 30°. Driver extension link 62 engages pressure plate 75 as it moves during the power stroke. Plate 75 is made of a hard material such as steel to reduce wear by rod 72 in slots 73. Plate 75 is mounted in a slot 70 in handle 12 (see FIG. 2). As pivot rod 72 moves upwardly in housing slots 73 an increased mechanical advantage (or toggle effect) is created. High forces are applied to driver 43 moving through small distances while lesser forces are required to be applied by the tool operator over greater distances.

The tool is capable of stapling workpieces of varying thicknesses. The thickness of the workpiece dictates the extent of downward movement of the anvil arms 66, 67 before the anvil's engagement with (and compression of) workpiece 82 prevents the anvil arm's further downward movement. Slots 52a, 53a permit the second handle operation to adjust to the varying workpiece thicknesses. The variable thickness of workpiece 82 is compensated for by movement of spaced-apart plates 52, 53 with slots 52a, 53a sliding up and down on guide rod 46, thereby permitting handles 12, 17 to engage at point D (FIG. 4) without any oversqueezing occurring.

I claim:

1. A hand-held tool having an anvil, a housing including a first handle and a staple discharge channel and a second handle mounted on the first handle which tool provides space between the discharge channel and anvil to receive the workpiece, the improvement comprising
   (a) an anvil mounted on the first handle for pivotal movement toward and away from the staple discharge channel;
   (b) staple drive means movable in the discharge channel along a path substantially perpendicular to the anvil;
   (c) anvil control arms each having end portions with an upper end portion pivotally mounted on the anvil and the other lower end portion connected to the second handle;
   (d) handle mounting means on the first handle for mounting the second handle including (a) a guide rod fixed to the first handle and positioned in slots formed in the second handle and including (b) pivotal connector means for connecting the lower ends of the anvil control arms to the second handle such mounting means permitting the second handle to move with the anvil and to rotate relative to the first handle until the anvil engages the workpiece;
   (e) elongated pusher means on the second handle engaged to the staple drive means which pusher means is shaped and sized so that as the second handle is moved toward the first handle the elongated pusher means moves to form an acute angle with the path of the staple driver means
   whereby the anvil is first brought against the workpiece and thereafter the second handle is rotated about the pivotal connector means of the lower ends of the anvil control arms until the elongated pusher means pushes the staple driver means a sufficient distance to drive the staple.

2. The tool of claim 1 in which the elongated pusher means includes a pivot rod mounted in one of its ends and the tool includes slots in the first handle in which the pivot rod rides to cause the pusher means to rotate to acute angles to the path of the staple driver means as the second handle is moved closer to the first handle.

3. The tool of claim 2 having in addition spring means for urging the handles apart when the tool is at rest.

* * * * *